US012110032B2

(12) United States Patent
Salter et al.

(10) Patent No.: US 12,110,032 B2
(45) Date of Patent: Oct. 8, 2024

(54) METHOD AND APPARATUS FOR ESTIMATING STRESS ON A VEHICLE BASE PLATE

(71) Applicant: Ford Global Technologies, LLC, Dearborn, MI (US)

(72) Inventors: Stuart C. Salter, White Lake, MI (US); David Brian Glickman, Southfield, MI (US); Brendan Diamond, Grosse Pointe, MI (US); William Wurz, San Francisco, CA (US); Shawn Ferret, Belleville, MI (US); William Jackson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 17/869,842

(22) Filed: Jul. 21, 2022

(65) Prior Publication Data

US 2024/0025423 A1  Jan. 25, 2024

(51) Int. Cl.
*B60W 40/13* (2012.01)
*B62D 33/02* (2006.01)
(Continued)

(52) U.S. Cl.
CPC ......... *B60W 40/13* (2013.01); *B62D 33/0207* (2013.01); *G01G 19/08* (2013.01);
(Continued)

(58) Field of Classification Search
CPC ............ B60W 40/13; B60W 2530/10; B60W 2420/22; B60W 2420/403; B60W 2420/42; B60W 2420/52; B60W 2420/54; B62D 33/0207; G01G 19/08; B65D 21/0223; A45C 5/14; A45C 7/005; A45C 13/02; B60R 9/06; B60R 9/065; B60R 2011/0084; G01L 1/22
(Continued)

(56) References Cited

U.S. PATENT DOCUMENTS 10,583,962 B2   3/2020   Brunner et al.
10,703,534 B2   7/2020   Brunner et al.
(Continued)

FOREIGN PATENT DOCUMENTS

CN     110530483 A    12/2019
CN     210505441 U     5/2020
(Continued)

OTHER PUBLICATIONS

US 10,947,009 B2, 03/2021, Brunner et al. (withdrawn)

*Primary Examiner* — Andrew Joseph Rudy
(74) *Attorney, Agent, or Firm* — Vichit Chea; Carlson, Gaskey & Olds, P.C.

(57) ABSTRACT

A base plate system includes at least one base plate configured to support at least one accessory and at least one sensor that is configured to determine at least one characteristic of the at least one accessory and/or the at least one base plate. A controller uses the at least one characteristic to estimate a stress and/or strain caused by the at least one accessory on the at least one base plate and predicts how the stress and/or strain could change depending on position of the at least one accessory and/or orientation of the at least one base plate within a vehicle.

20 Claims, 3 Drawing Sheets

(51) Int. Cl.
*G01G 19/08* (2006.01)
*G01L 1/22* (2006.01)

(52) U.S. Cl.
CPC ............ *G01L 1/22* (2013.01); *B60W 2420/22* (2013.01); *B60W 2420/403* (2013.01); *B60W 2420/408* (2024.01); *B60W 2420/54* (2013.01); *B60W 2530/10* (2013.01)

(58) Field of Classification Search
USPC ........................................................ 701/460
See application file for complete search history.

(56) References Cited

U.S. PATENT DOCUMENTS

| | | | |
|---|---|---|---|
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| 11,027,883 B1 | 6/2021 | Brunner et al. | |
| D920,671 S | 7/2021 | Brunner et al. | |
| D923,935 S | 7/2021 | Brunner et al. | |
| 11,192,690 B1 | 12/2021 | Brunner et al. | |
| 11,225,188 B2 * | 1/2022 | Bossenbroek | B60P 7/10 |
| 11,268,691 B2 | 3/2022 | Plato et al. | |
| 11,325,659 B2 * | 5/2022 | Mannone | B60P 7/0815 |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 11,807,195 B2 * | 11/2023 | Luckette | B60R 9/065 |
| 2018/0058046 A1 | 3/2018 | Chitty et al. | |
| 2023/0116745 A1 * | 4/2023 | Salter | B60P 7/0815 248/542 |

FOREIGN PATENT DOCUMENTS

| | | |
|---|---|---|
| CN | 113984165 A | 1/2022 |
| CN | 215865441 U | 2/2022 |
| WO | 2021010263 A1 | 1/2021 |

* cited by examiner

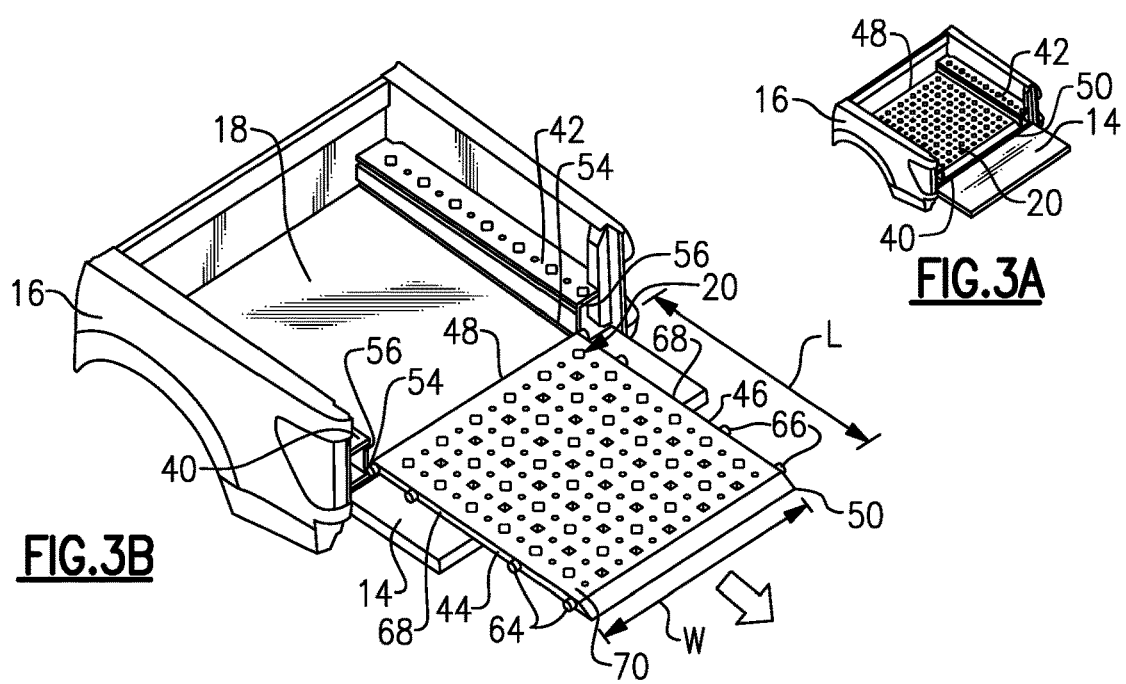
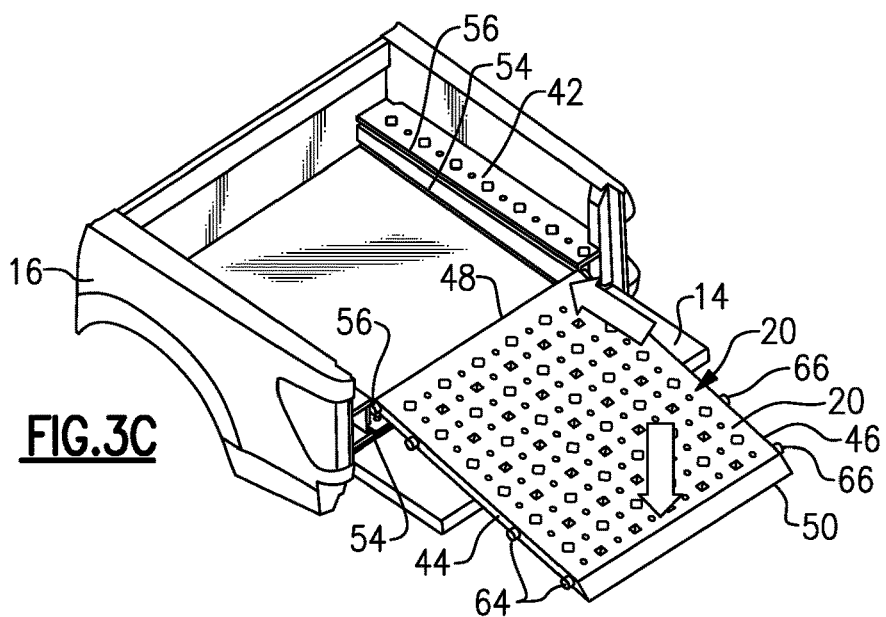
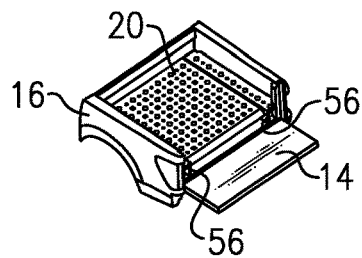
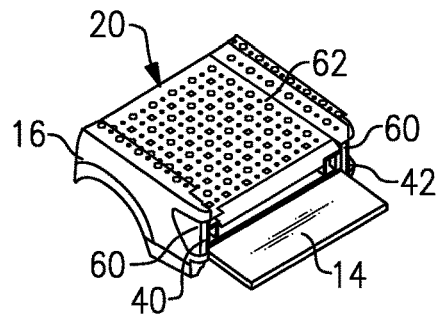

METHOD AND APPARATUS FOR ESTIMATING STRESS ON A VEHICLE BASE PLATE

TECHNICAL FIELD

This disclosure relates generally to a base plate and, more particularly, to a method and apparatus for estimating stress and/or strain on a base plate that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Placement of heavier accessories within a cargo area of the vehicle can result in high loading being focused on an area of a cargo support surface.

SUMMARY

In some aspects, the techniques described herein relate to a base plate system, including: at least one base plate configured to support at least one accessory; at least one sensor configured to determine at least one characteristic of the at least one accessory and/or the at least one base plate; and a controller that uses the at least one characteristic to estimate a stress and/or strain caused by the at least one accessory on the at least one base plate and predicts how the stress and/or strain could change depending on position of the at least one accessory and/or orientation of the at least one base plate within a vehicle.

In some aspects, the techniques described herein relate to a system, wherein the at least one sensor includes at least one camera, at least one radar sensor, at least one sonar sensor, and/or an on-board scales system.

In some aspects, the techniques described herein relate to a system, wherein the controller determines if estimated stress and/or strain on the base plate exceeds predetermined limits, and if predetermined limits are exceeded, the controller provides signals and/or instructions to a user regarding how to move the at least one base plate and/or to distribute one or more accessories based on estimated stress and/or strain to minimize any focused loading areas on the at least one base plate.

In some aspects, the techniques described herein relate to a system, wherein the controller infers stress and/or strain based on the at least one characteristic which comprises at least accessory weight and position.

In some aspects, the techniques described herein relate to a system, wherein the controller infers stress and/or strain based on the at least one characteristic which comprises at least deflection of the at least one base plate.

In some aspects, the techniques described herein relate to a system, wherein the controller infers stress and/or strain using strain gauges that are associated with the at least one base plate.

In some aspects, the techniques described herein relate to a system, the system including a track assembly mounted within a vehicle cargo area and providing at least a first tier track and a second tier track, and wherein the at least one base plate has opposing edges supported by the track assembly, wherein a height of the at least one base plate within the vehicle cargo area is varied by switching the at least one base plate between the first tier track and the second tier track.

In some aspects, the techniques described herein relate to a system, wherein the controller analyzes base plate stress and/or strain: during normal operation, with the at least one base plate in a fully installed position within the cargo area; during a rocking/pivoting/sliding operation as the at least one base plate is moved between the first and second tier tracks or to an extended position; and during full extension where the at least one base plate remains in a fully extended position.

In some aspects, the techniques described herein relate to a system, wherein, if estimated stress and/or strain on the at least one base plate exceeds predetermined limits, the controller issues a control signal to lock the at least one base plate in a specified configuration or issues a control signal to lock-out movement of the at least one base plate to other base plate positions.

In some aspects, the techniques described herein relate to a method, including: estimating a stress and/or strain caused by at least one accessory supported on at least one base plate; sensing at least one characteristic of the at least one accessory and/or the at least one base plate to provide input data; and predicting how the stress and/or strain could change depending on position of the at least one accessory and/or orientation of the at least one base plate within a vehicle based on the input data.

In some aspects, the techniques described herein relate to a method, wherein the at least one characteristic is sensed using at least one sensor comprising at least one camera, at least one radar sensor, at least one sonar sensor, and/or an on-board scales system.

In some aspects, the techniques described herein relate to a method, the method including determining if estimated stress and/or strain on the at least one base plate exceeds predetermined limits, and if predetermined limits are exceeded, generating signals and/or instructions to a user regarding how to move the at least one base plate and/or to distribute one or more accessories based on estimated stress and/or strain to minimize any focused loading areas on the at least one base plate.

In some aspects, the techniques described herein relate to a method, the method including inferring stress and/or strain based on the at least one characteristic which comprises at least accessory weight and position.

In some aspects, the techniques described herein relate to a method, the method including using at least one camera and OBS to determine weight and position of the at least one accessory.

In some aspects, the techniques described herein relate to a method, the method including inferring stress and/or strain based on the at least one characteristic which comprises at least deflection of the at least one base plate.

In some aspects, the techniques described herein relate to a method, wherein the controller infers stress and/or strain using strain gauges that are associated with the at least one base plate.

In some aspects, the techniques described herein relate to a method, the method including positioning a plurality of strain gauges on a bottom surface of the at least one base plate, wherein each strain gauge is positioned at specified location that is susceptible to high stress.

In some aspects, the techniques described herein relate to a method, the method including mounting a track assembly within a vehicle cargo area, providing the track assembly with at least a first tier track and a second tier track, and adjusting a height of the at least one base plate within the vehicle cargo area by switching the at least one base plate between the first tier track and the second tier track.

In some aspects, the techniques described herein relate to a method, the method including analyzing base plate stress and/or strain: during normal operation, with the at least one base plate in a fully installed position within the cargo area; during a rocking/pivoting/sliding operation as the at least one base plate is moved between the first and second tier tracks or to an extended position; and during full extension where the at least one base plate remains in a fully extended position.

In some aspects, the techniques described herein relate to a method, wherein, if estimated stress and/or strain on the at least one base plate exceeds predetermined limits, generating a control signal to lock the at least one base plate in a specified configuration or generating a control signal to lock-out movement of the at least one base plate to other base plate positions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3A is a perspective view of an adjustable base plate mounting system with the base plate in a fully installed position on a lower tier of the track.

FIG. 3B is a view similar to FIG. 3A but with the base plate in the a fully extended position.

FIG. 3C is a view similar to FIG. 3A but shows the base plate pivoting from the lower tier of the track to an upper tier of the track.

FIG. 3D is a view similar to FIG. 3A but shows the base plate fully installed on an upper tier of the track.

FIG. 3E is a perspective view with the base plate installed on an additional upper tier such that the base plate can be used as a cover for the cargo bed.

DETAILED DESCRIPTION

This disclosure details a method and apparatus for estimating stress on a base plate that is used to secure accessories to a vehicle. The disclosure further details an adjustable mounting system for a base plate that is positioned within a vehicle cargo area. The system includes a base plate that provides an attachment interface for securing accessories to the vehicle. The system allows a height of the base plate within the vehicle cargo area to be selectively adjusted. Various types of accessories can be secured to the vehicle through the attachment interface provided by the base plate. The number and positions of base plates can be adjusted for particular vehicles or particular needs. The disclosure also provides for a system and method that estimates stress on the base plate and predicts how the stress could change depending on the accessory position and orientation of the base plate. The disclosed system and method also provides instructions to a user regarding how to move the base plate and/or distribute the accessories based on the current stress state to minimize any focused overloading.

Figure 1:
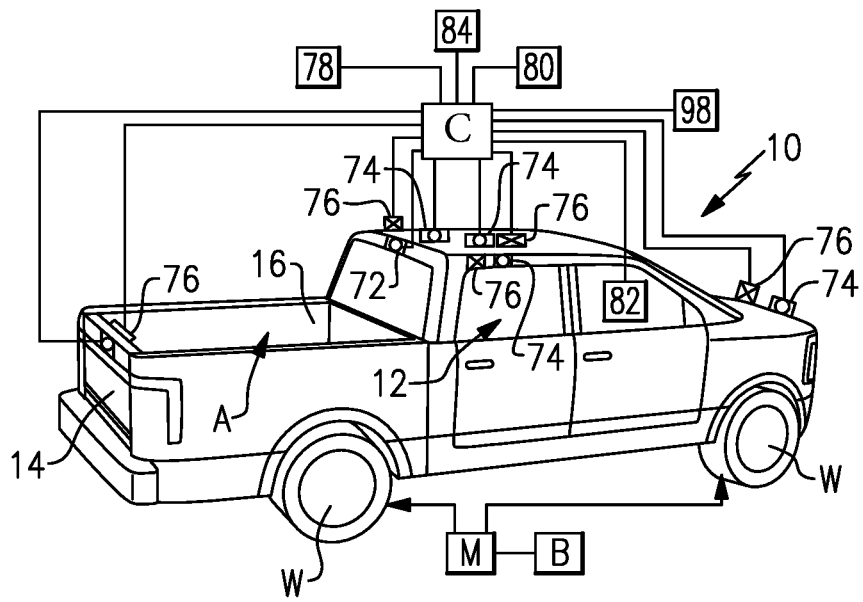
FIG. 1 illustrates a perspective view of a vehicle having a cargo bed that can be equipped with base plates used to secure accessories according to an exemplary aspect of the present disclosure.
Figure 2:
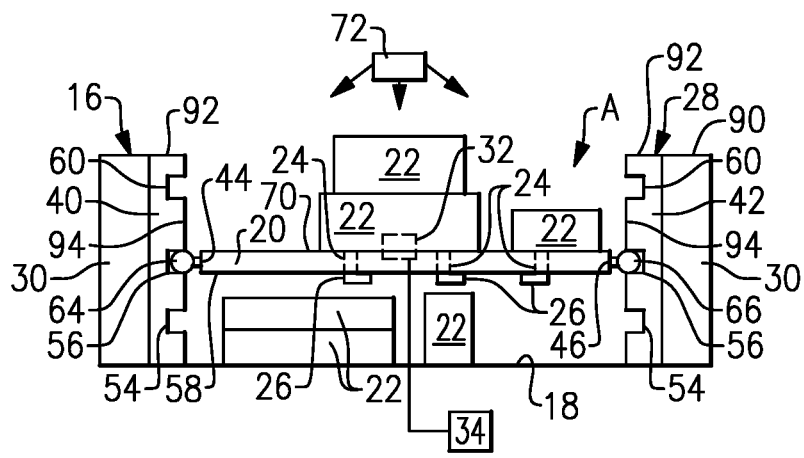
FIG. 2 is a schematic representation of a track system used to adjust a height of a base plate within a cargo area.

FIGS. 1-4 disclose exemplary embodiments of the adjustable base plate system that interfaces with a track assembly within a vehicle cargo area. With reference to FIGS. 1 and 2, a vehicle 10 includes a passenger compartment 12 and a tailgate 14 that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

At least one base plate 20 is positioned within the cargo bed 16. Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection.

The accessories 22 can engage one or more of the base plates 20 using an attachment system. In the exemplary embodiment, the attachment system includes a plurality of apertures 24 and at least one foot 26 that cooperate to provide a mechanical connection interface. The base plate 20 is supported relative to the vehicle surface 18 of the cargo area A with an additional support interface that is separate from the mechanical connection interface for the accessories 22. In one example, the additional support interface comprises a track assembly 28 that is positioned to extend along side walls 30 of the cargo bed 16.

In one example, the base plates 20 provide the apertures 24 and the accessories 22 include the plurality of feet 26. This could be rearranged, however, such that one or all of the feet 26 extend from the base plates 20 and the accessories 22 provide some or all of the apertures 24.

In the exemplary embodiment, when the base plate 20 and the accessories 22 are engaged, the feet 26 are each received within one of the apertures 24 such that the feet 26 each extend from a first side of the base plate 20, through one of the apertures 24, and past an opposite, second side of the base plate 20.

In one example, the accessory 22 comprises a lockable box that is mechanically coupled to the vehicle 10 through the base plate 20. Optionally, the accessory 22 could additionally comprise a lockable box that includes a power interface 32. In one example, the power interface 32 comprises a wireless inductive charger where one of the base plate 20 and the accessory 22 includes a transmitting coil and the other of the base plate 20 and accessory 22 includes a receiving coil. This type of charging interface would allow devices within the lockable box to be powered from a vehicle power supply 34 such as the battery pack B, for example. The internal device could be a refrigerated container that is powered by the vehicle 10 when the box is engaged with the base plate 20, or the devices within the lockable box could comprise rechargeable tools, which can be recharged when set within the box and coupled to a charging interface between the accessory 22 and the base plate 20. In one example, the base plate 20 can be plugged into either 12V vehicle power or other power sources via a variety of connections/outlets.

In the subject disclosure, a track assembly 28 is used to mount one or more base plates within the cargo area A. In one example, the track assembly 28 comprises a first track structure configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

As shown in FIG. 2 the first 44 and second 46 edges are parallel to each other. The base plate 20 also has a third edge 48 and a fourth edge 50 that are parallel and spaced apart from each other (FIG. 3B). The third 48 and fourth 50 edges connect to the first 44 and second 46 edges such that the base plate 20 comprises a four-sided generally flat and planar mount surface to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area A can be adjusted.

Additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16. FIG. 2 shows at least an additional third tier track 60 that is provided on each of the first track structure 40 and the second track structure 42. The third tier track 60 is spaced apart from the first 54 and second 56 tier tracks in the vertical direction V. In one example, when the base plate 20 is installed on the third tier track 60, the base plate serves as a tonneau cover 62 (FIG. 3E) that encloses the vehicle cargo area A.

By installing the base plate 20 on the second tier track 56, the base plate 20 is vertically higher than when the base plate 20 is supported by the first tier track 54. This increases the available cargo area between the bottom surface 58 of the base plate 20 and the support surface 18 of the cargo area A. Additionally, the support surface 18 is free from any base plate support structures between the first track structure 40 and the second track structure 42 as shown in FIG. 2. This further increases available cargo area and also allows for the base plates to be completely removed from the vehicle such that the support surface 18 can receive large, tall items such as furniture, large boxes, etc.

In one example, the edges 44, 46 of the base plate 20 include low-friction members that allow the base plate 20 to be easily moved along the first 54 and second 56 tier tracks such that the base plate 20 can be switched between the different height levels. In one example, a first set of sliders or rollers 64 are positioned on the first edge 44 of the base plate 20 and a second set of sliders or rollers 66 are positioned on the second edge 46 of the base plate 20.

In one example, the base plate 20 has a width W extending in a lateral direction across a width of the vehicle 10 and a length L extending in a longitudinal direction along a length of the vehicle 10. The first 44 and second 46 edges of the base plate 20 extend in the longitudinal direction and the third 48 and fourth 50 edges of the base plate 20 extend in the lateral direction. The first 44 and second 46 edges of the base plate 20 have edge surfaces 68 that are perpendicular to a cargo support surface 70 of the base plate 20. The first 64 and second 66 sets of rollers are respectively spaced apart from each other in the longitudinal direction along the first 44 and second 46 edges of the base plate 20. In one example, the first 64 and second 66 sets of rollers extend outwardly of the first 44 and second 46 edges of the base plate 20 in the lateral direction. In one example, the rollers comprise axles that are fixed to the base plate edges with roller elements supported on the axles to independently rotate about a respective axis of the axles.

In one example, the first track structure 40 and the second track structure 42 are steel, roll-formed structures that are mounted to side walls 30 of the cargo bed 16 and/or to outermost edge portions of the support surface 18. In one example, the first 40 and second 42 track structures have a cross-section that comprises an upper plate 92 and a side plate 94. The upper plate 92 extends in the lateral direction and the side plate 94 extends in a vertical direction. The first 54, second 56, and third 60 tier tracks are formed within the side plate 94. In one example, the first 54, second 56, and third 60 tier tracks comprise a C-shape or U-shape. The open cross-section of the C-shape or U-shape is open in a direction that faces the cargo area A. As discussed above, the first 64 and second 66 sets of rollers are either positioned on the first tier track 54, the second tier track 56, or on the third tier track to install the base plate 20 in the vehicle cargo area A.

FIG. 3A shows the base plate in a fully installed position on the lower tier track 54. To change the position of the base plate 20, the fourth edge 50, e.g. a rearward edge, of the base plate is moved at least partially outwardly of the vehicle cargo area A via the first 64 and second 66 sets of rollers along the first tier track 54 as shown in FIG. 3B. The base plate 20 is then removed from the first tier track 54 and is installed on the second tier track 56. Optionally, the base plate can be completely removed from the cargo area A as needed.

In one example, the base plate 20 is moved in a rearward direction along the lower tier track 54 such that a rearward end of the base plate 20 extends outwardly of the vehicle cargo area, and then the rearward end of the base plate 20 is pivoted downward to move a forward end 48 of the base plate 20 in an upward direction to the upper tier track 56 as shown in FIG. 3C. Finally, the forward end of the base plate 20 is then moved in a forward direction to install the base plate on the upper tier track 56 as shown in FIG. 3D. FIG. 2 shows how much the cargo area underneath the base plate 20 is increased by moving to the upper tier track 56. FIG. 3E shows the base plate 20 installed on the additional upper tier track 60 to provide the option of a cover 62.

As discussed above, the disclosure provides for a system and method that estimates stress/strain on the base plate 20 and predicts how the stress/strain could change depending on the accessory position and orientation of the base plate 20. The disclosed system and method also provides instructions to a user regarding how to move the base plate 20 and/or distribute the accessories 22 based on the current stress state to minimize any focused overloading.

In one example, existing vehicle sensors are used to provide information to a system controller C to analyze the stress/strain on the base plate 20 within the cargo area A. Once the system controller C receives the input data/information, an analysis is performed and it is determined if any recommendations can be made to the user/driver to adjust accessory location and/or height within the cargo area A. In one example, the sensors include one or more of a center high-mounted stop lamp (CHMSL) camera 72, additional cameras 74, sonar and/or radar sensors 76, on-board scales (OBS) system 78, and any other vehicle sensors, etc., to determine position, weight, and/or height of accessories in the cargo area A. Wireless communication via a wireless interface 80 also takes place between accessories 22 attached to the base plate 20 and the controller C to determine if boxes/accessories 22 are actually attached to the base plate 20. Wireless communication can also take place between any of the sensors and the controller.

The subject disclosure provides a bed plate stress and strain estimation system that is used to prevent loads on the base plate 20 from exceeding predetermined levels. The system will use the existing vehicle sensor suite, which includes the cameras and sensors discussed above, to estimate the stress and strain of the objects/accessories 22 placed on the base plate 20, to predict how the stress could change depending on the object position and orientation of the base plate 20, and provide recommendations and instructions to the user regarding how to operate the base plate 20 based on the current stress state to minimize the chance of loads exceeding predetermined levels.

As such, the system analyzes base plate stress/strain using existing sensors to both reduce overstress and to predict when the base plate will exceed a predetermined limit. This analysis will take place during normal operation with the base plate 20 slid into a fully installed position and during a rocking/pivoting operation as the base plate 20 is moved to a new level or just extended out over the tailgate 14 to a fully extended position for better access. The stress/strain can be determined in many different ways.

Figure 5:
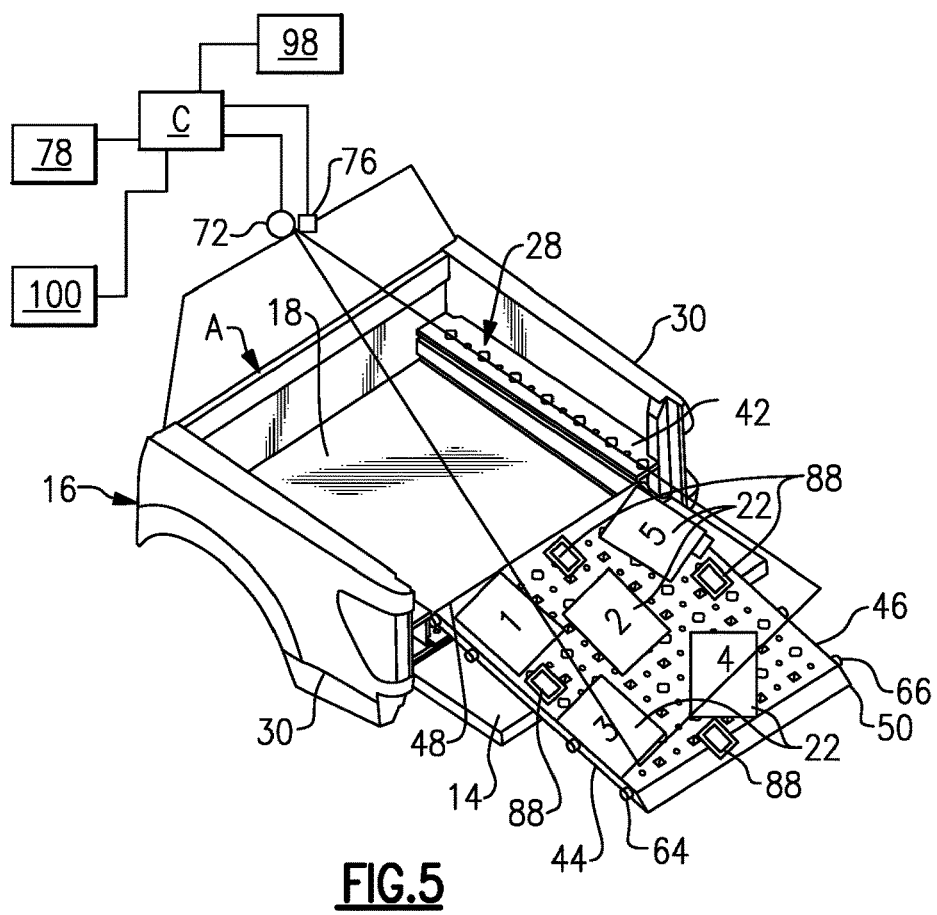
FIG. 5 is similar to FIG. 4 but showing a plurality of accessories on the base plate.

In one example, stress is estimated by inferring base plate stress based on accessory weight/position as determined by the CHMSL camera 72 and/or onboard scales 78 (see FIG. 5). In one example, the controller C can use exterior sensors, e.g. cameras 72-74, radar sensors 76, etc., to determine when a someone is approaching the cargo bed 16 of the vehicle 10. The system will also use the radar 76, CHMSL camera 72, and other OBS system 78 to determine if and when someone places objects/accessories 22 into the cargo bed 16 and onto the base plate 20. The placement of the object/accessory 22 on the base plate 20 will also be determined for stress/moment calculations later on in the process. In one example, the CHMSL camera 72 will use AI/ML based image recognition algorithms and positional estimates of the objects/accessories on the base plate 20 to determine the position of each object/accessory 22. Artificial intelligence (AI) provides for the creation of intelligent machines that can simulate human thinking capability and behavior, whereas, machine learning (ML) is an application or subset of AI that allows machines to learn from data without being programmed explicitly.

In one example, the controller C will then estimate a mass of each object/accessory 22 as it is placed into the cargo bed 16 of the vehicle using the OBS system 78 and the exterior and interior sensor suite as discussed above. The base plate stress will be estimated based on accessory weight and position on the base plate 20. For example, placing a heavy accessory in a middle of the base plate 20 creates more stress on the base plate 20 then placing it along one side of the base plate 20. As objects/accessories 22 are placed into the cargo bed 16 of the vehicle 10, payload estimates using the OBS 78 will be performed to estimate the accessory weight before and after the accessory 22 is placed in the cargo bed 16 of the vehicle 10. Optionally, manual input regarding the weight of each accessory can also be used as needed. In one example, interior cameras can also monitor if objects/people enter into the interior cabin 12 of the vehicle 10 to ensure the weight estimate is accurate.

In another example, stress is estimated by inferring base plate stress based on plate deflection as measured by multiple inductive chargers associated with the accessories 22. This method allows for an inference of the base plate deflection/deformation distance based on a change in charger efficiency. Wireless charger efficiency is sensitive to minor changes in distance between transmitting and receiving coils at the power interface 32 (FIG. 2). This is due to either a varying distance between coils or misalignment of coils. Because the alignment of the accessory coil at the power interface 32 is fixed, then the change in power transmission efficiency will be due to weight causing bending of the base plate 20, which opens a gap between the coils. As the controller for each coil knows how much power is being transmitted and received, reporting this information back to the system can be made as a simple request. Bending of the base plate (strain) at any position is directly related to the stress via stress v. strain curves. The stress v. strain curve shows that stress and strain increase in a generally linear manner until a yield point is reached, then as the stress and strain further increases through strain hardening it reaches a yield strength. Once yield strength is reached the material is subject to necking, and as bending load input continues it will eventually lead to fracture. This means that based on cumulative stresses potential fractures of the base plate 20 can be predicted.

Figure 4:
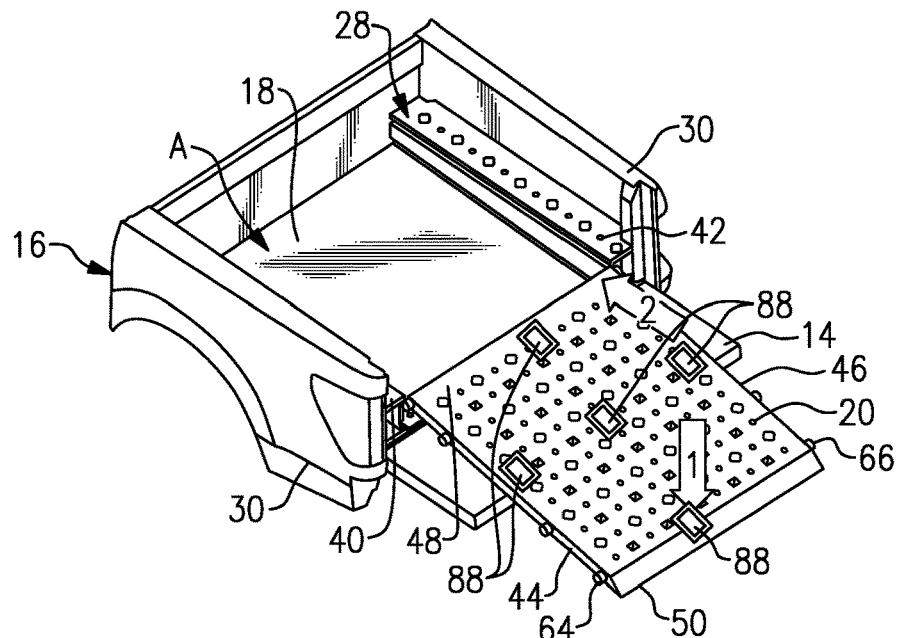
FIG. 4 is similar to FIG. 3C but showing strain gauges installed on the base plate.

In another example, stress is estimated using by using strain gauges 88 (FIG. 4). In one example, strain gauges 88 are integrated underneath the base plate 20 in key areas regarding where fracture is most likely to occur and/or where the maximum stress and strain could occur. The location of each strain gauge 88 will be communicated to the controller such that the vehicle understands where each stress/strain estimate is located on the base plate 20. In one example, the strain gauges 88 will wirelessly communicate strain, and based on the physical properties of the base plate 20, the stress realized on various parts of the plate can be directly measured.

By using the various stress estimation methods discussed above, the stress throughout the entire base plate 20 can be estimated by assuming the object's center of mass is in the middle of the object. Essentially by determining the location of each force and the surrounding stress at various locations in the base plate 20, the stress throughout the base plate 20 can be estimated using basic static equations such as Von Mises Stress equations and inputting force locations/stress values into a simplified finite element analysis (FEA) black box stress estimating model.

Once the stress has been estimated, the controller C can signal the user/driver via an output device 98 when yield strength is being approached so that the base plate 20 can avert any deterioration. The controller C stores in memory the areas of the base plate 20 that have been subjected to strain hardening/necking and factors this into new calculations on where fatigue is likely to fracture the base plate 20. The controller C can also give loading advice via sound exciters, for example, on areas that should be loaded lightly because the areas may be subject to further deterioration in the near future.

In one example, the controller C will then determine if the measured and estimated payload/stress on the base plate 20 exceeds the stress/weight limits of the base plate system based on the relative position of the base plate 20. Limits can also be based on the expected maneuvering of the base plate 20, such having the base plate 20 being shifted from one level to another. Predetermined values for stress/weight limits will be identified to prevent stress from increasing beyond yield strength of the base plate 20. The weight/stress limits for the base plate 20 can be developed based on the base plate being in an extended, partially extended, or fully retracted position. Weight/stress limits will be developed and will be based on ensuring the vehicle meets the design/usage requirements of the user/driver. The controller C may include look up tables that track stress by position for purposes of determining fatigue. The controller C will track both general and rocking/pivoting loads experienced by the base plate 20.

An amount of stress varies by the position of the base plate 20 out over the tailgate 14 and the static/dynamic load applied to the base plate 20. In one example situation, general overloading over long periods of time/usage will result in a high probability of deterioration. In one example, the controller C will also do a calculation for stress over time if boxes/accessories 22 are loaded in the center and are not evenly distributed, and if the boxes/accessories 22 are not at sides of the cargo bed 16. Another high probability for likelihood of deterioration is having the base plate 20 be rocked from one level to another while loaded. When these situations are identified, the controller C will then inform the user/driver to perform certain actions to prevent the deterioration, to reduce the stress, to reduce loading directly on the base plate, or to prevent certain base plate movements that could result in deterioration if performed in current conditions. The controller C can also provide recommendations and instructions regarding any next steps to use the base plate without experiencing deterioration. Signals or instructions can be provided to the user/driver via an output 98 comprising audible signals or direct communication to a vehicle display or a user smart device.

In one example, the signals/instructions can suggest that the accessory be rearranged, reoriented, and/or be moved to a different location on the base plate 20. Accessory movement will be based on available space, number of accessories, the weight of each accessory, and the size of each accessory to determine if rearranging accessories will result in a lower stress condition. If this is not possible, the signals/instructions may suggest that the accessory be removed from the base plate and placed in an interior compartment 12 of the vehicle 10.

In another example, the signals/instructions can suggest that the base plate 20 not be placed in a specific orientation or location, such as fully or partially extended when loaded for example, until certain accessories/loads are removed from the base plate 20.

In another example, the signals/instructions can be used to help ensure the accessories 22 are placed in a lower stress configuration if possible even if the current configuration is within design limits.

In another example, the controller C can issue a control signal to activate a locking mechanism 100 to lock the base plate in certain configurations or to lock-out movement to other base plate positions based on loading and potential for fracture. The controller C can issue pre-emptive suggestions both for rolling out and rocking between levels.

In another example, people walking on the base plate 20 can be monitored to determine how their weight and position affect the stress/strain on the base plate 20.

In one example, the controller C is a dedicated control unit, or the controller C can be incorporated as part of an existing controller on the vehicle 10. The controller C can include a processor, memory, and one or more input and/or output (I/O) device interface(s) that are communicatively coupled via a local interface. The local interface can include, for example but not limited to, one or more buses and/or other wired or wireless connections. The local interface may include address, control, and/or data connections to enable appropriate communications among the aforementioned components. The controller C may be a hardware device for executing software, particularly software stored in memory. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The Input/Output devices that may be coupled to system I/O Interface(s) may include input devices, for example but not limited to, a keyboard, mouse, scanner, microphone, camera, proximity device, smart device, etc. Further, the Input/Output devices may also include output devices, for example but not limited to, a printer, display, smart device, etc. The controller C can be configured to execute software stored within the memory, to communicate data to and from the memory, and to generally control operations of the computing device pursuant to the software.

In the subject disclosure, the controller C is configured to receive data from the various vehicle sensors 72-78, process the data, and analyze the data to recommend and/or suggest payload adjustment options via the output device 98. The output device 98 can comprise an audio output, an output to a vehicle screen/display, an output to a smart device, etc. In one example, the controller C determines the various locations of cargo/accessories 22 within the cargo bed area A, estimates the stress and/or strain exerted by the weight of each accessory 22 on the base plate 20, predicts how the stress could change depending on variation of the accessory position and orientation of the base plate 20, and makes recommendations as to how to move the base plate 20 and/or distribute the accessories 22 based on the current stress state to minimize any focused overloading.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A base plate system, comprising:
   at least one base plate configured to support at least one accessory;
   at least one sensor configured to determine at least one characteristic of the at least one accessory and/or the at least one base plate; and
   a controller that uses the at least one characteristic to estimate a stress and/or strain caused by the at least one accessory on the at least one base plate and predicts how the stress and/or strain could change depending on position of the at least one accessory and/or orientation of the at least one base plate within a vehicle.

2. The base plate system according to claim 1, wherein the at least one sensor includes at least one camera, at least one radar sensor, at least one sonar sensor, and/or an on-board scales system.

3. The base plate system according to claim 1, wherein the controller determines if estimated stress and/or strain on the base plate exceeds predetermined limits, and if predetermined limits are exceeded, the controller provides signals and/or instructions to a user regarding how to move the at least one base plate and/or to distribute one or more accessories based on estimated stress and/or strain to minimize any focused loading areas on the at least one base plate.

4. The base plate system according to claim 1, wherein the controller infers stress and/or strain based on the at least one characteristic which comprises at least accessory weight and position.

5. The base plate system according to claim 1, wherein the controller infers stress and/or strain based on the at least one characteristic which comprises at least deflection of the at least one base plate.

6. The base plate system according to claim 1, wherein the controller infers stress and/or strain using strain gauges that are associated with the at least one base plate.

7. The base plate system according to claim 1, including a track assembly mounted within a vehicle cargo area and providing at least a first tier track and a second tier track, and wherein the at least one base plate has opposing edges supported by the track assembly, wherein a height of the at least one base plate within the vehicle cargo area is varied by switching the at least one base plate between the first tier track and the second tier track.

8. The base plate system according to claim 7, wherein the controller analyzes base plate stress and/or strain:
   during normal operation, with the at least one base plate in a fully installed position within the cargo area;
   during a rocking/pivoting/sliding operation as the at least one base plate is moved between the first and second tier tracks or to an extended position; and
   during full extension where the at least one base plate remains in a fully extended position.

9. The base plate system according to claim 8, wherein, if estimated stress and/or strain on the at least one base plate exceeds predetermined limits, the controller issues a control signal to lock the at least one base plate in a specified configuration or issues a control signal to lock-out movement of the at least one base plate to other base plate positions.

10. A method comprising:
    estimating a stress and/or strain caused by at least one accessory supported on at least one base plate;
    sensing at least one characteristic of the at least one accessory and/or the at least one base plate to provide input data; and
    predicting how the stress and/or strain could change depending on position of the at least one accessory and/or orientation of the at least one base plate within a vehicle based on the input data.

11. The method according to claim 10, wherein the at least one characteristic is sensed using at least one sensor comprising at least one camera, at least one radar sensor, at least one sonar sensor, and/or an on-board scales system.

12. The method according to claim 10, including determining if estimated stress and/or strain on the at least one base plate exceeds predetermined limits, and if predetermined limits are exceeded, generating signals and/or instructions to a user regarding how to move the at least one base plate and/or to distribute one or more accessories based on estimated stress and/or strain to minimize any focused loading areas on the at least one base plate.

13. The method according to claim 10, including inferring stress and/or strain based on the at least one characteristic which comprises at least accessory weight and position.

14. The method according to claim 13, including using at least one camera and OBS to determine weight and position of the at least one accessory.

15. The method according to claim 10, including inferring stress and/or strain based on the at least one characteristic which comprises at least deflection of the at least one base plate.

16. The method according to claim 10, wherein the controller infers stress and/or strain using strain gauges that are associated with the at least one base plate.

17. The method according to claim 10, including positioning a plurality of strain gauges on a bottom surface of the at least one base plate, wherein each strain gauge is positioned at specified location that is susceptible to high stress.

18. The method according to claim 10, including mounting a track assembly within a vehicle cargo area, providing the track assembly with at least a first tier track and a second tier track, and adjusting a height of the at least one base plate within the vehicle cargo area by switching the at least one base plate between the first tier track and the second tier track.

19. The method according to claim 18, including analyzing base plate stress and/or strain:
    during normal operation, with the at least one base plate in a fully installed position within the cargo area;
    during a rocking/pivoting/sliding operation as the at least one base plate is moved between the first and second tier tracks or to an extended position; and
    during full extension where the at least one base plate remains in a fully extended position.

20. The method according to claim 19, wherein, if estimated stress and/or strain on the at least one base plate exceeds predetermined limits, generating a control signal to lock the at least one base plate in a specified configuration or generating a control signal to lock-out movement of the at least one base plate to other base plate positions.

* * * * *